H. MÜRY.
APPARATUS FOR COOLING CARBONIC ACID DURING ITS COMPRESSION.
APPLICATION FILED JUNE 3, 1914.
1,184,370.
Patented May 23, 1916.
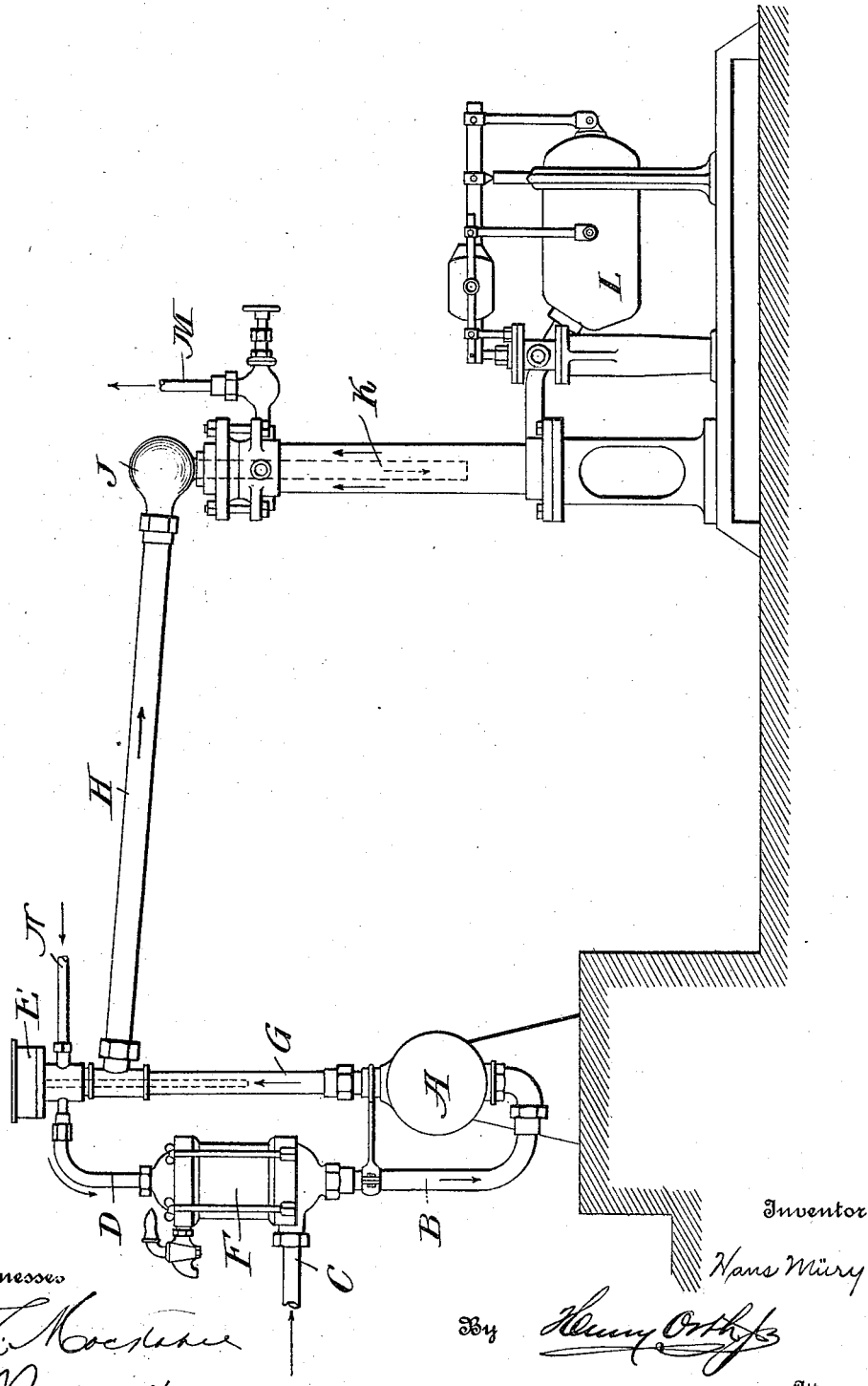

UNITED STATES PATENT OFFICE.

HANS MÜRY, OF ZURICH, SWITZERLAND, ASSIGNOR TO HERMANN FRISCH, OF ZURICH, SWITZERLAND.

APPARATUS FOR COOLING CARBONIC ACID DURING ITS COMPRESSION.

1,184,370.  Specification of Letters Patent.  Patented May 23, 1916.

Application filed June 3, 1914. Serial No. 842,679.

*To all whom it may concern:*

Be it known that I, HANS MÜRY, a citizen of Switzerland, residing at Zurich, neue Beckenhofstrasse 15, Switzerland, have invented certain new and useful Improvements in Apparatus for Cooling Carbonic Acid During Its Compression; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to apparatus for cooling carbonic acid during its compression and has for its object to overcome certain disadvantages in existing apparatus.

My invention is particularly applicable to the collecting and compression of the carbonic acid resulting from the fermentation of beer wort. For this purpose it is necessary that the gas be not too highly heated by the compression, otherwise the ethereal substances of the wort contained in the gas will be destroyed.

Many apparatus have heretofore been constructed with a view to the accomplishment of the desired result, but without success. For example, in one of the known methods the carbonic acid is absorbed immediately after its generation in water during its passage through compressors and pipes, and maintained cool. The mixture should not exceed a temperature of 10° R. The gas is immediately separated from the cooling water, which latter is repeatedly used for absorbing and releasing fresh quantities of carbonic acid gas. By the continued circulation and the absorption of repeated quantities of gas, the water becomes heated from the heat of compression of the gas, and the gas is also heated to this temperature. Furthermore, the water soon becomes saturated, in which condition it has a chemical, solvent action on the metal of the pipes. Another disadvantage of this method is that the unavoidable heating of the mixture causes water vapors or steam to be carried over into the gaseous acid storage receptacle, from which the acid gas is drawn to saturate the beer. All these objections are overcome by the invention forming the subject matter of this application, and I have the additional advantage of cooling the gas during its compression, and the complete separation of the gas from the cooling water without affecting the value of the ethereal substances that follows the gas.

In the accompanying drawing I have illustrated an apparatus for effecting the cooling and compression of carbonic acid gas according to my invention.

The gas coming from the wort passes through pipe C and then passes by a short pipe B to the compression cylinder A. The cooling water passes through pipe D and sight-glass F also into pipe B, and both air and gas enter cylinder A together. The quantity of water passing through pipe D is controlled by a temperature controller E of well known construction, supplied with water from a suitable system and under pressure, through a pipe N. The gas-water mixture passes from cylinder A into a container G, and the quantity of water passing through D is dependent upon the temperature in container G, which controls the regulator E, which is placed directly on the container C; that is to say, the greater the heat of the mixture, the greater will be the quantity of water that is allowed to pass through E and D whereby the temperature of the mixture is maintained substantially constant. Such a uniformity of temperature as is attained by placing the controller E directly on the container G has not been attained heretofore in other apparatus. This uniformity of temperature is of especial importance in the compression of carbonic acid gas.

By the automatic control of the cooling water, as in my invention, a uniform compression temperature is attained, which has not been possible heretofore, because the compensation for the temperature changes has not been direct.

From the container G the uniformly compressed carbonic acid gas with its cooling water passes to pipe H, which is downwardly inclined. The quantity of cooling water used is small and fills the pipe H to about one-tenth of its diameter. The pipe H is of greater internal diameter than the container G. The pipe or conduit H terminates in a spherical expansion chamber J. The expansion takes place in both pipe H and chamber J at the same time, separating the gas from the water. Any water vapor carried by or mixed with the gas also separates, and the water descends into a container K from which it passes to a separator L of any desired construction. The cooling water is used only once. The compressed gas, completely separated from the cooling water, is discharged from the chamber K through a pipe M to the storage tank, in which no water condensation will take place.

I claim—

1. In apparatus for compressing carbonic acid gas, the combination with a compression cylinder A and means to supply carbonic acid gas thereto; of a container G directly connected to the discharge side of said cylinder, and a temperature controlled water-supply device E connected to said chamber, said device controlling the quantity of cooling water admitted to said cylinder, in order to act directly on the temperature of the mixture of cooling water and compressed acid gas.

2. In apparatus for compressing carbonic acid gas, the combination with a compression cylinder and means to simultaneously admit gas and cooling water to the cylinder; of a chamber G directly connected to the discharge end of said cylinder, a controller E on said chamber actuated by temperature of the mixture and controlling the quantity of cooling water supplied to said cylinder, a downwardly inclined expansion conduit H, into which said chamber G discharges, and an expansion chamber J at the end of said conduit H, the water vapors condensing in both, the expansion conduit H and the expansion chamber J.

3. The combination with the compression cylinder of a compressor, of means to supply both carbonic acid gas and a liquid absorbent of carbonic acid to said cylinder for simultaneously compressing and absorbing said gas in said liquid under pressure, and cooling said gas during absorption, a container into which the compression mixture is discharged, means in said chamber to increase the quantity of absorbent admitted to said cylinder in accordance with the temperature of the mixture, and means to permit the separation of gas and absorbent to separately discharge them.

In testimony that I claim the foregoing as my invention, I have signed my name in presence of two subscribing witnesses.

HANS MÜRY.

Witnesses:
 WILH. REINHARD,
 AUGUST RUEGG.

Copies of this patent may be obtained for five cents each, by addressing the "Commissioner of Patents Washington, D. C."